United States Patent [19]

Masuda et al.

[11] Patent Number: 5,007,884
[45] Date of Patent: Apr. 16, 1991

[54] BELT FOR HIGH LOAD TRANSMISSION

[75] Inventors: Takashi Masuda; Kengiro Hashimoto, both of Kobe; Shinichi Takagi, Nishinomiya; Masayuki Tanaka, Kobe, all of Japan

[73] Assignee: Mitsuboshi Belting Ltd., Japan

[21] Appl. No.: 462,611

[22] Filed: Jan. 9, 1990

Related U.S. Application Data

[62] Division of Ser. No. 235,162, Aug. 23, 1988.

[30] Foreign Application Priority Data

Sep. 1, 1987 [JP] Japan .................. 62-133862

[51] Int. Cl.$^5$ .................. F16G 5/16; F16G 1/22
[52] U.S. Cl. .................. 474/242; 474/244; 474/265
[58] Field of Search ............ 474/201, 237, 238, 242, 474/244, 245, 261, 263, 265, 266, 267, 268, 271; 156/137-142; 428/224, 292-295, 492, 902

[56] References Cited

U.S. PATENT DOCUMENTS

| 1,664,335 | 3/1928 | Todd | 474/242 |
| 2,182,461 | 12/1939 | Yeakel | 474/205 |
| 3,673,883 | 7/1972 | Adams | 474/205 |
| 4,365,965 | 12/1982 | Russ, Sr. | 474/244 |
| 4,642,080 | 2/1987 | Takano et al. | 474/244 |
| 4,734,087 | 3/1988 | Takano et al. | 474/244 X |

FOREIGN PATENT DOCUMENTS 1137003 11/1955 France .................. 474/242

Primary Examiner—Thuy M. Bui
Attorney, Agent, or Firm—Wood, Phillips, Mason, Recktenwald & VanSanten

[57] ABSTRACT

A power transmission belt having longitudinally spaced pairs of blocks on the opposite surfaces of a neutral belt portion thereof. The blocks are formed of hard synthetic resin materials having fibers distributed therein. The fibers may be provided in the form of distributed short fibers, fabrics, and one or more different types of fibers may be utilized in the respective blocks. The fibers include carbon fibers, aramid fibers, and silicon carbide fibers. The neutral belt is provided with longitudinally spaced projections on the upper and lower surfaces thereof and the blocks are provided with complementary recesses receiving the projections. The recesses are preferably deeper than the height of the projections, whereby the distal surfaces of the blocks may be urged with high frictional engagement against the flat surfaces of the neutral belt. The blocks are resiliently clamped to the neutral belt and the clamping forces are urged through the neutral belt to the tensile cord carried therein for further improved stabilization of the blocks on the neutral belt.

15 Claims, 3 Drawing Sheets

BELT FOR HIGH LOAD TRANSMISSION

This is a division of application Ser. No. 235,162, filed Aug. 23, 1988.

TECHNICAL FIELD

This invention relates to power transmission belts and in particular to power transmission belts adapted for carrying high loads.

BACKGROUND ART

In U.S. Pat. No. 4,642,080 of Hiroshi Takano et al., which patent is owned by the assignee hereof, a power transmission belt is disclosed having an elastomeric looped flat belt portion provided with a longitudinally extending tensile cord. A plurality of longitudinally spaced blocks are provided in aligned pairs on the outer and inner surfaces of the flat belt portion. The blocks are secured to the belt by bolts extending through the blocks and belt.

Such blocks are conventionally formed by winding fabric impregnated with a setting material, such as synthetic resin or rubber. Such blocks are made to be relatively hard and are provided with short fibers. One excellent form of known block utilizes glass fibers which provide excellent strength, high bending elasticity, compression resistance and wear resistance. Further, the glass fibers increase the frictional coefficient of the block against the belt surface so as to permit utilizing the friction between the block and the belt to resist shearing of the block from the belt when shearing forces are applied thereto, such as when the belt is used to transmit heavy loads with low belt tension.

One common form of such belt drive, however, is one utilizing speed shifting pulleys wherein the belt moves radially outwardly or inwardly about the pulley in effecting the desired speed change. Because of the relatively high friction of the fiberglass belt, however, resistance to smooth movement of the belt inwardly and outwardly between the two confronting faces of the pulley halves prevents a smooth transition in the speed change.

One attempted solution to this problem has been to mix oil $MoS_2$ or graphite in the block material to reduce the coefficient of friction. Where oil has been used, it has been found that the volatile oil tends to leach out of the rubber during continued use, whereby the belt again has undesirable high friction characteristics.

In one form of known belt, the blocks are provided with recesses receiving outwardly extending projections on the belt for improved resistance to shear from the high loads applied thereto. It has been conventional to cause the recesses to accurately conform to the projections. As there is a tendency for the block portion engaging the neutral, or flat, belt portion at the sides of the projections to wear, the frictional engagement of the blocks with the flat belt portion thereat becomes reduced, thereby weakening the frictional retention force and thereby weakening the belt structure against shear forces applied to the blocks by high loads.

DISCLOSURE OF INVENTION

The present invention comprehends an improved power transmission belt adapted for transmitting high loads with improved resistance to shear of the blocks relative to the neutral flat belt portion, while yet permitting smooth movement of the belt radially inwardly outwardly in variable speed pulleys in the operation thereof.

In one form, the invention comprehends a power transmission belt including an elastomeric neutral belt defining an outer flat surface and an inner flat surface, a tensile cord extending longitudinally in the neutral belt, a plurality of pairs of aligned longitudinally, equally spaced first and second blocks adjacent the outer and inner surfaces respectively of the neutral belt, and securing means extending through the neutral belt and the aligned blocks for removably securing said aligned blocks to the outer and inner surfaces, the neutral belt surfaces defining longitudinal spaced outer and inner aligned projections, the blocks being provided with a recess receiving the projections and having a depth greater than the height of the projections, the securing means comprising means for causing the blocks to be compressed against the neutral belt into clamped frictional engagement with the belt flat surfaces.

In one form of the invention, the projections and recesses are trapezoidal, and in a modified form, the projections and recesses are rounded in cross section.

In the illustrated embodiment, the blocks are trapezoidal in cross section.

The securing means, in the illustrated embodiment, comprise elongated elements having resiliently turned ends clampedly engaging the outer surface of the block for resiliently urging the legs of the block against the neutral belt projection.

The invention further comprehends the provision of a power transmission belt for transmitting high loads, including an elastomeric neutral belt defining an outer flat surface and an inner flat surface, a tensile cord extending longitudinally in the neutral belt, a plurality of pairs of aligned longitudinally, equally spaced first and second blocks adjacent the outer and inner surfaces respectively of the neutral belt, and securing means extending through the neutral belt and the aligned blocks for removably securing said aligned blocks to the outer and inner surfaces, the blocks having an outer portion comprising thermoset synthetic resin material having friction-reducing fibers distributed therein.

In one form, the blocks comprise molded blocks of wound synthetic resin-coated fabric.

The fabric may comprise a cloth, a cord fabric, a nonwoven fabric, etc.

In the illustrated embodiment, at least one yarn of the fabric is formed of a material selected from the group consisting of carbon fiber, aramid fiber and silicon carbon fiber.

The invention further comprehends the provision of a power transmission belt for transmitting high loads including an elastomeric neutral belt defining an outer flat surface and an inner flat surface, a tensile cord extending longitudinally in the neutral belt, a plurality of pairs of aligned longitudinally, equally spaced first and second blocks adjacent the outer and inner surfaces respectively of the neutral belt, and securing means extending through the neutral belt and the aligned blocks for removably securing said aligned blocks to the outer and inner surfaces, the neutral belt surfaces defining longitudinal spaced outer and inner aligned projections, the blocks being provided with a recess receiving the projections and having a depth greater than the height of the projections, the securing means comprising means for causing the blocks to be compressed against the neutral belt into clamped frictional engagement with the belt flat surfaces, said blocks comprising a core and a U-shaped outer wall portion extending about said core, said outer wall portion defining the recess of the block.

In one form of the invention, the outer wall portion comprises an aramid fiber reinforced synthetic resin material. In another form, the outer wall portion comprises a carbon fiber reinforced synthetic resin material.

The outer wall portion may be formed of a synthetic resin-coated fabric molded about the core.

In one embodiment, one of the core and the outer wall portion is formed of a carbon fiber reinforced synthetic resin material and the other of the core and outer wall portion comprises an aramid fiber reinforced synthetic resin material.

The invention comprehends alternatively that at least one of the core and outer wall portions comprise a silicon carbide fiber reinforced synthetic resin material.

The invention further comprehends the provision of a power transmission belt for transmitting high loads including an elastomeric neutral belt defining an outer flat surface and an inner flat surface, a tensile cord extending longitudinally in the neutral belt, a plurality of pairs of aligned longitudinally, equally spaced first and second blocks adjacent the outer and inner surfaces respectively of the neutral belt, and securing means extending through the neutral belt and the aligned blocks for removably securing said aligned blocks to the outer and inner surfaces, the neutral belt surfaces defining longitudinal spaced outer and inner aligned projections, the blocks being provided with a recess receiving the projections and having a depth greater than the height of the projections, the securing means comprising means for causing the blocks to be compressed against the neutral belt into clamped frictional engagement with the belt flat surfaces, the blocks comprising one-piece molded synthetic resin elements having friction-reducing fibers distributed therein.

The invention comprehends that the friction-reducing fibers comprise one or more fibers taken from the group consisting of carbon fibers, aramid fibers, and silicon carbide fibers.

The invention comprehends that the blocks have metal foil distributed therein for dissipating heat in the blocks.

The invention comprehends that the fibers be provided in the form of fabric.

The fabric may be provided in a plurality of layers of different fabrics.

The power transmission belt of the present invention is extremely simple and economical of construction, while yet providing highly improved adjustable speed functioning under high loads.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
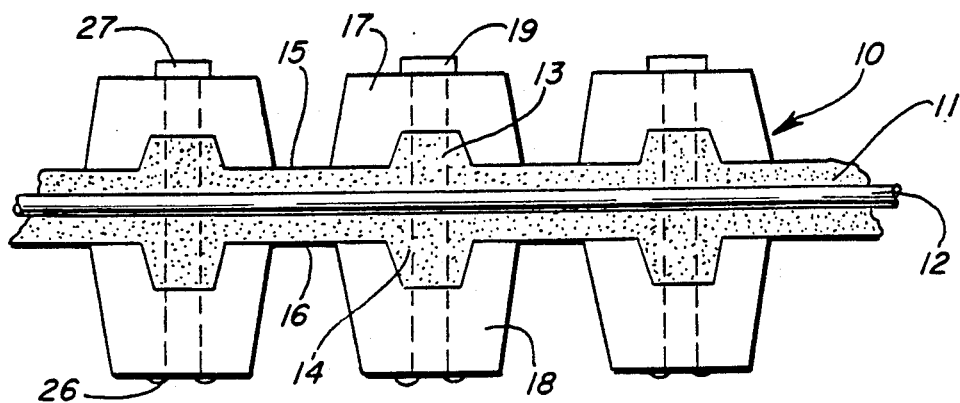
FIG. 1 is a longitudinal section of a power transmission belt embodying the invention.

In the illustrative embodiment of the invention as disclosed in the drawing, a power transmission belt generally designated 10 is shown to comprise a neutral belt 11 having longitudinally extending tensile cords 12 formed of a high strength synthetic resin. Neutral belt 11 may be formed of a suitable flexible material, such as rubber.

The neutral belt is provided at longitudinally spaced intervals with oppositely outwardly projecting projections 13 and 14. Intermediate the projections, the neutral belt defines an outer flat surface 15 and an inner flat surface 16.

Complementary pairs of blocks 17 and 18 are secured to the neutral belt 11 against the outer surface 15 and inner surface 16, respectively, by securing, or retaining, elements 19. As seen in FIG. 1, the retaining elements may comprise rivets extending through the blocks and projections.

Figure 2:
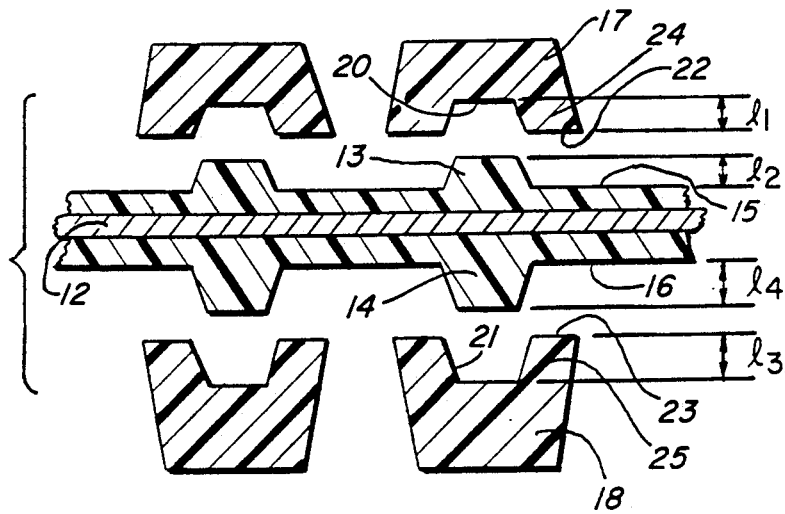
FIG. 2 is an exploded view showing dimensional relationships between the projections and recesses of the neutral belt and blocks, respectively.

As seen in FIG. 2, blocks 17 define trapezoidal recesses 20 and blocks 18 define trapezoidal recesses 21.

Projections 13 and 14 are generally similar in cross section to recesses 20 and 21, respectively. However, the legs of the blocks have a length slightly greater than the height of the projections, whereby the securing elements 19 compressively urge the distal surfaces 22 and 23 of the blocks 17 and 18, respectively, forcibly against the flat surfaces 15 and 16 of the neutral belt to provide a high friction engagement therebetween. As shown in FIG. 2, the depth of the recesses 20, or length of the legs 24 11 is greater than the height of the projections 13 12, and the depth of the recesses 21 or legs 25 13 is greater than the height of the projections 14 14.

As seen in FIG. 1, the securing elements may comprise rivets 19. The distal end 26 of the rivets may be turned to engage the outer surface of the blocks and forcibly compress the blocks against the neutral belt, with the leg surfaces 22 and 23 of the blocks tightly frictionally engaging the belt surfaces 15 and 16.

As shown, the rivets are provided with conventional heads 27 engaging the outer surface of the blocks 17.

Figure 12:
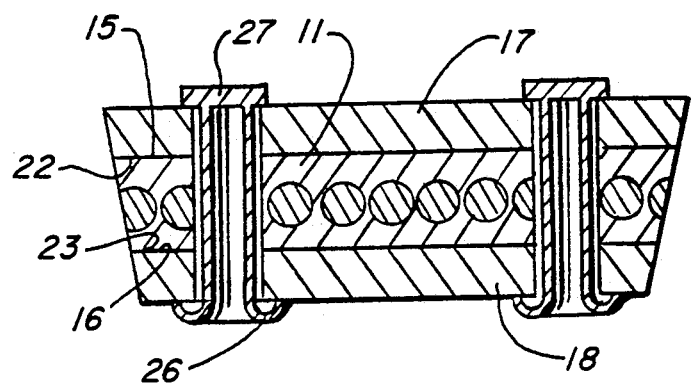
FIG. 12 is a transverse cross section illustrating the use of a pair of securing elements at opposite sides of the belt and securing the blocks to the neutral belt portion.

As shown in FIG. 12, a pair of such securing means rivets may be utilized in securing each of the blocks to the belt being disposed in transversely spaced relationship.

As the thickness of the neutral belt outwardly from the tensile cords is relatively small, the compressive force of the legs acting against the flat surface of the neutral belt is transmitted to the tensile cords, thereby further stabilizing and strengthening the mounting of the blocks to the neutral belt.

Figure 13:
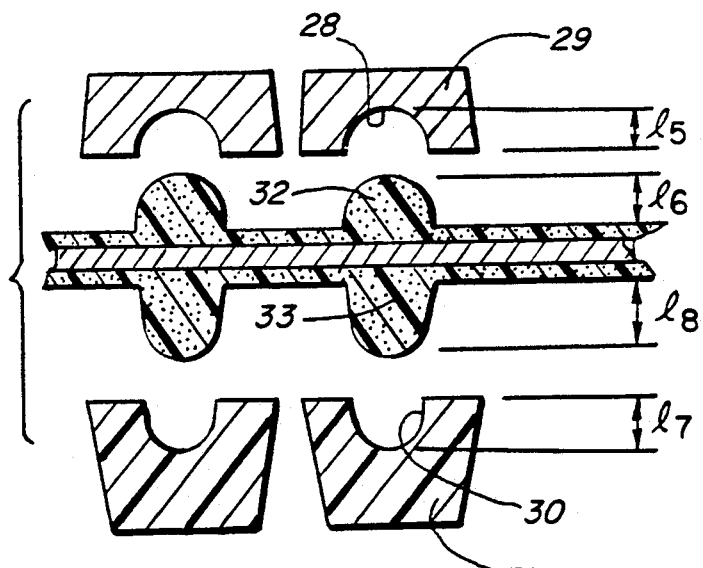
FIG. 13 is a view similar to that of FIG. 2, but illustrating a modified form of the invention wherein the projections and recesses are rounded.

As illustrated in FIG. 13, the projections and recesses of the neutral belt and blocks, respectively, may be rounded in lieu of the trapezoidal configuration of the embodiment of FIGS. 1 and 2. Thus, as seen in FIG. 13, the recesses 28 of the blocks 29 and recesses 30 of the blocks 31 may comprise right circularly cylindrical recesses and the projections 32 and 33 are complementarily right circularly cylindrical. As in the embodiment of FIGS. 1 and 2, the recesses 28 may have a depth 15 which is greater than the height 16 of the projections 32 and the recesses 30 may have a depth 17 which is greater than the height 18 of the projections.

The cylindrical configuration of the recesses and projections provides an improved increased facial engagement between the blocks and projections.

The blocks are formed of a relatively hard material, such as hard rubber, having 85° or higher hardness, synthetic resins, such as phenol, epoxy, nylon, polyester, acrylic, methacrylic, polyamide, etc. resins. The resins may be reinforced by distributing therein short fibers, such as cotton yarn fibers, chemical fibers, glass fibers, metallic fibers, etc. Alternatively, the block material may be reinforced with cloths, such as canvas, etc.

A number of different block constructions for use in practicing the invention are illustrated in FIGS. 3-10.

In one form, the block generally designated 128 comprises a core 129 and an outer wall portion 130. The core is formed of an aramid fiber reinforced synthetic resin and the outer wall portion 130 is formed of a carbon fiber reinforced synthetic resin wrapped about the core.

Figure 4:
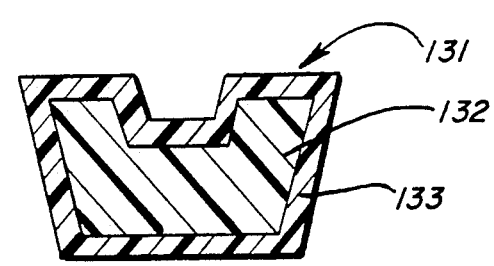
FIG. 4 is a cross section of a block embodying the invention wherein the core is formed of carbon fiber reinforced synthetic resin and the outer wall portion is formed of an aramid fiber reinforced synthetic resin.

In FIG. 4, a block 131 is formed of a core 132 formed of carbon fiber reinforced synthetic resin, and an outer wall portion 133 formed of an aramid fiber reinforced synthetic resin.

Figure 3:
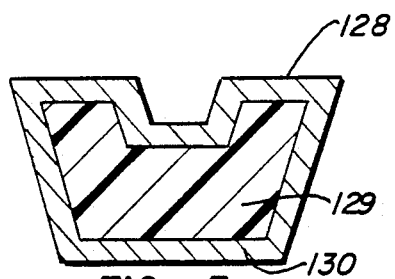
FIG. 3 is a cross section of a block embodying the invention having a core formed of an aramid fiber synthetic resin and an outer wall portion formed of a carbon fiber reinforced synthetic resin.

The embodiments of FIGS. 3 and 4 may be readily made by wrapping a resin impregnated fabric about the preformed core, which may be, for example, U-shaped, and completing the molding of the block in a suitable compression mold.

Figure 5:
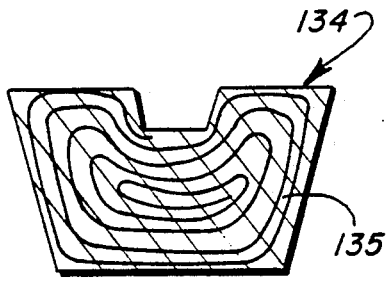
FIG. 5 is a cross section of a block embodying the invention made up of spirally wound fabrics made of aramid fiber reinforced synthetic resin and carbon fiber reinforced synthetic resin.

In FIG. 5, a further modified form of block 134 is shown to comprise a block wherein a laminated pair of aramid fiber reinforced synthetic resin fabric material and carbon fiber reinforced synthetic resin fabric material is spirally wound and then molded as a monolithic block having a spiral wrapped laminate 135 embedded therein.

Figure 6:
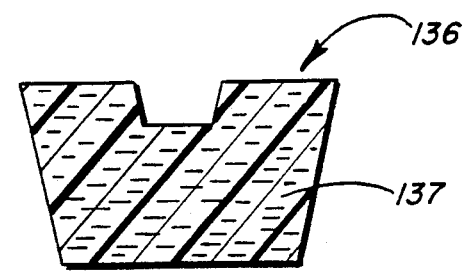
FIG. 6 is a cross section of a block embodying the invention comprising a monolithic block of carbon fiber reinforced synthetic resin.

A further modified form of block embodying the invention is shown in FIG. 6 to comprise a block 136 formed of a carbon fiber reinforced synthetic resin wherein short carbon fibers are uniformly distributed in the resin.

Figure 7:
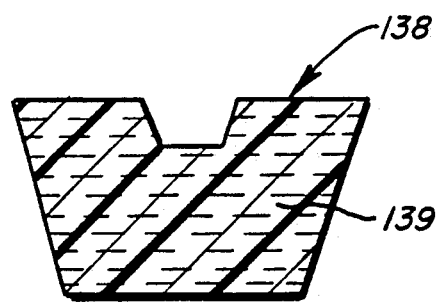
FIG. 7 is a cross section of a block embodying the invention comprising a monolithic block of aramid fiber reinforced synthetic resin.

In FIG. 7, another form of block embodying the invention generally designated 138 is shown wherein short aramid fibers 139 are embedded in the synthetic resin.

Figure 8:
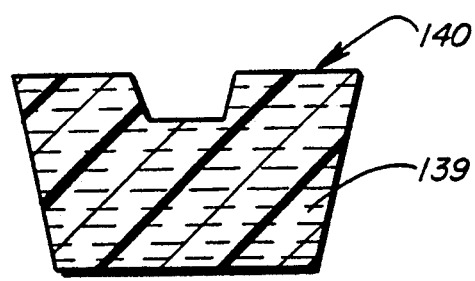
FIG. 8 is a cross section of a block embodying the invention comprising a monolithic block formed of a cloth of aramid fiber and carbon fiber reinforced synthetic resin.

In FIG. 8, another form of block embodying the invention generally designated 140 is shown wherein short carbon fibers 137 and short aramid fibers 139 are embedded in the synthetic resin.

Figure 9:
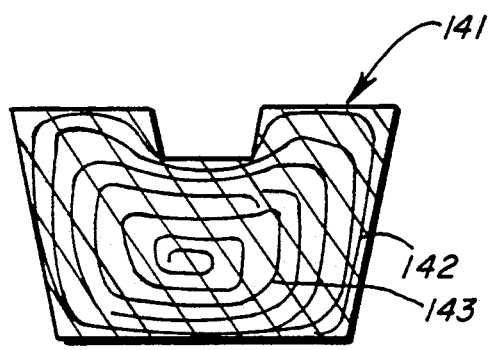
FIG. 9 is a cross section of a block embodying the invention having a core portion comprising a wound fabric of an aramid fiber reinforced synthetic resin, and an outer portion of a carbon fiber reinforced synthetic resin.

Referring now to FIG. 9, a block embodying the invention generally designated 141 is formed by wrapping a carbon fiber reinforced synthetic resin fabric 142 about an aramid fiber reinforced synthetic resin fabric 143 wound as a core, with the thusly wrapped fabrics molded under compression to form the block as seen in FIG. 9.

Figure 10:
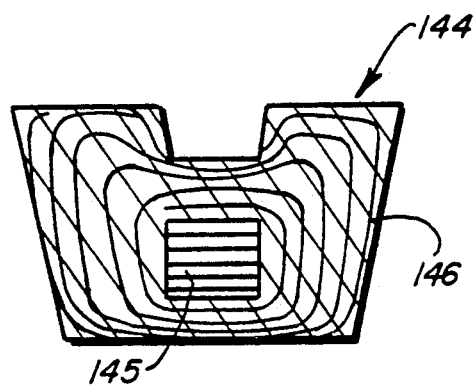
FIG. 10 is a cross section of a block embodying the invention similar to that of FIG. 9, but wherein the core is laminated.
Figure 11:
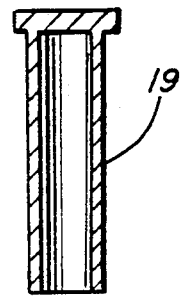
FIG. 11 is a diametric section of a rivet adapted to form the securing means of the blocks.

In FIG. 10, another modified form of block embodying the invention comprises a block 144 similar to block 141 but wherein the core 145 is formed by superimposed layers of the core fabric. The core fabric may comprise an aramid fiber reinforced synthetic resin fabric, and the outer fabric may comprise a carbon fiber synthetic resin fabric 146.

As will be obvious to those skilled in the art, silicon carbide fiber may be substituted for either of the carbon fiber or aramid fiber of the embodiments described above. Alternatively, all three of the different types of fibers may be used in the blocks.

To provide for heat dissipation, aluminum foil may be wound into the block construction.

The use of the fibers in the different embodiments discussed above provides blocks which have a reduced frictional coefficient for improved speed shifting operation. By virtue of the clamping of the blocks forcibly against the neutral belt flat surfaces, a maintained high frictional engagement of the block distal leg surfaces with the neutral belt surfaces is obtained, and the clamping action of the two blocks is transmitted to the tensile cord to provide a further improved, stable, shear-resistant association of the blocks with the neutral belt.

As the neutral belt is formed of a more resilient material than the blocks, the compression of the neutral belt between the blocks provides a high friction, high strength connection therebetween. In the illustrated embodiment, the amount of compression of the neutral belt is preferably in the range of approximately 2% to 20%, as determined by the formula $12 - 11/12 \times 100$, or $14 - 13/14 \times 100$.

Where the hardness of the neutral belt is in the range of approximately 75° to 85°, the maximum compression is preferably somewhat lower and, thus, in the range of approximately 2% to 15%.

While the securing means has been described as a rivet 19, as will be obvious to those skilled in the art, bolts and other suitable securing elements may be utilized in lieu thereof within the broad scope of the invention. The use of the rivet is preferred in that the turned ends 26 act as springy members providing a resilient clamping force of the blocks against the neutral belt. Further, where wear of the belt may occur, a tightening of the securing means may be readily effected by simple further upsetting of the turned ends.

Where the blocks are formed by utilizing fibers in the form of wound fabrics, sufficient synthetic resin is provided on the fabric to provide a monolithic body in the final molded block, with the fabric molded thereinto. The fabric may be coated with the synthetic resin in the conventional manner. In the illustrated embodiment, the synthetic resins are preferably thermoset resins providing a hard, molded block construction having long, troublefree life. The fibers may be used as sole yarns, combined yarns, or combined and twisted yarns, and may be provided in the form of cord fabrics, cloth, nonwoven fabrics. One highly advantageous fabric has been found to be canvas. The power transmission belts utilizing the blocks of the invention have been found to have improved long, troublefree life, with reduced wear of the blocks and providing smooth speed change operations. A comparison of power transmission belts utilizing blocks of the invention with that of the conventional block utilizing glass cloth is set out in the following Table 1.

TABLE 1

|  | Resin | Reinforcing resin | Structure | Bending elasticity kg/mm$^2$ | Compression strength kg/mm$^2$ | Wear amount cc/hr | Frictional coefficient |
| --- | --- | --- | --- | --- | --- | --- | --- |
| Comparison Example | epoxy | glass facric | spiral | 2040 | 30 | 4.6 | 0.4 |
| Example 1 | epoxy | carbon fabric | spiral | 2600 | 41 | 2.1 | 0.14 |
| Example 2 | epoxy | aramid cord | spiral | 1500 | 18 | 1.5 | 0.18 |
| Example 3 | epoxy | carbon/aramid | wrapping-hollow | 2000 | 28 | 1.8 | 0.16 |
| Example 4 | imide | carbon/aramid | wrapping-hollow | 2300 | 30 | 1.6 | 0.17 |

For very high loads, it is preferable to use a high percentage or all carbon fibers in the block construction.

A durability test was run with the examples of Table 1, wherein the torque transmitted was 18 kg-m, and the speed shifting ratio was set to 5. The results of this test are set out in the following Table 2.

|  | Durability time (hrs.) |
| --- | --- |
| Comparison example | Impossible to test due to no speed shift |
| Example 1 | 530 |
| Example 2 | 120 |
| Example 3 | 420 |
| Example 4 | 470 |

The foregoing disclosure of specific embodiments is illustrative of the broad inventive concepts comprehended by the invention.

We claim:

1. In a power transmission belt for transmitting high loads, said belt including:
   an elastomeric neutral belt defining an outer flat surface and an inner flat surface, said belt including longitudinally spaced outer and inner aligned projections having heights;
   a tensile cord extending longitudinally in said neutral belt;
   a plurality of pairs of aligned longitudinally, equally spaced first and second blocks adjacent said outer and inner surfaces respectively of said neutral belt, at least one of said blocks being provided with a recess for receiving one of said projections having a depth different than the height of said projection and surfaces for contacting a neutral belt flat surface, said blocks having an outer portion comprising thermoset synthetic resin material having friction-reducing fibers distributed therein; and
   means for securing said blocks to said neutral belt, said securing means extending through said neutral belt and the aligned blocks to said outer and inner surfaces, said securing means comprising means for causing said surfaces of said one block to be compressed against a neutral belt flat surface,
   whereby said belt flat surface and said surfaces of one said block are in clamped, high friction engagement.

2. The power transmission belt of claim 1 wherein said blocks comprise molded blocks of wound synthetic resin-coated fabric.

3. The power transmission belt of claim 1 wherein said blocks comprise molded blocks of wound synthetic resin-coated fabric selected from the group consisting of a cloth, a cord fabric, and a nonwoven fabric.

4. The power transmission belt of claim 1 wherein said blocks comprise molded blocks of wound synthetic resin-coated fabric having at least one yarn thereof formed of material selected from the group consisting of aramid fiber and silicon carbide fiber.

5. The power transmission belt of claim 1 further including metal foil distributed in said blocks for dissipating heat from the blocks.

6. The power transmission belt of claim 1 wherein said friction-reducing fibers comprise silicone carbide.

7. The power transmission belt of claim 1 wherein said friction-reducing fibers comprise aramid fibers.

8. In a power transmission belt for transmitting high loads, said belt including:
   an elastomeric neutral belt defining an outer flat surface and an inner flat surface, said belt including longitudinally spaced outer and inner aligned projections having heights;
   a tensile cord extending longitudinally in said neutral belt;
   a plurality of pairs of aligned longitudinally, equally spaced first and second blocks adjacent said outer and inner surfaces respectively of said neutral belt, said blocks comprising a core and a U-shaped outer wall portion extending about said core, said outer wall portion defining a recess for receiving a projection and surfaces for contacting a neutral belt flat surface, at least one of said recesses of said blocks having a depth different than the height of said projections; and
   means for securing said blocks to said neutral belt, said securing means extending through said neutral belt and the aligned blocks to said outer and inner surfaces, said securing means comprising means for causing said surfaces of said one block to be compressed against a neutral belt flat surface,
   whereby said belt flat surface and said surfaces of one said block are in clamped, high friction engagement.

9. The power transmission belt of claim 8 wherein said outer wall portion comprises an aramid fiber reinforced synthetic resin material.

10. The power transmission belt of claim 8 wherein said outer wall portion comprises a carbon fiber reinforced synthetic resin material.

11. The power transmission belt of claim 8 wherein said outer wall portion comprises a synthetic resin-coated fabric molded about said core.

12. The power transmission belt of claim 8 wherein one of said core and said outer wall portion comprises an aramid fiber reinforced synthetic resin material and the other of said core and said outer wall portion comprises a carbon fiber reinforced synthetic resin material.

13. The power transmission belt of claim 8 wherein at least one of said core and outer wall portion comprises a silicon carbide fiber reinforced synthetic resin material.

14. In a power transmission belt for transmitting high loads, said belt including:
an elastomeric neutral belt defining an outer flat surface and an inner flat surface, said belt including longitudinally spaced outer and inner aligned projections having heights and rounded in cross-section;
a tensile cord extending longitudinally in said neutral belt;
a plurality of pairs of aligned longitudinally, equally spaced first and second blocks adjacent said outer and inner surfaces respectively of said neutral belt, said blocks being provided with a recess rounded in cross-section for receiving a projection and surfaces for contacting a neutral belt flat surface, at least one of said recesses of said blocks having a depth different than the height of said projections; and
means for securing said blocks to said neutral belt, said securing means extending through said neutral belt and the aligned blocks to said outer and inner surfaces, said securing means comprising means for causing said surfaces of said one block to be compressed against a neutral belt flat surface,
whereby said belt flat surface and said surfaces of one said block are in clamped, high friction engagement.

15. In a power transmission belt for transmitting high loads, said belt including:
an elastomeric neutral belt defining an outer flat surface and an inner flat surface, said belt including longitudinal spaced outer and inner aligned projections having heights;
a tensile cord extending longitudinally in said neutral belt;
a plurality of pairs of aligned longitudinally, equally spaced first and second blocks adjacent said outer and inner surfaces respectively of said neutral belt, said blocks comprising one piece molded synthetic resin elements having silicone carbide fibers distributed therein, said blocks being provided with a recess for receiving a projection and surfaces for contacting a neutral belt flat surface, at least one of said recesses on one of said blocks having a depth different than the height of said projections;
means for securing said blocks to said neutral belt, said securing means extending through said neutral belt and the aligned blocks to said outer and inner surfaces, said securing means comprising means for causing said surfaces of said one block to be compressed against a neutral belt flat surface,
whereby said belt flat surface and said surfaces of said one block are in clamped, high friction engagement.

* * * * *